3,054,754
CATALYSTS FOR THE PREPARATION OF TRANS 1,4 POLYISOPRENE (SYNTHETIC BALATA) AND METHODS FOR THEIR PREPARATION
Jack S. Lasky, East Orange, N.J., assignor to United States Rubber Company, New York, N.Y., a corporation of New Jersey
No Drawing. Filed Mar. 16, 1959, Ser. No. 799,424
15 Claims. (Cl. 252—429)

This invention relates to improvements in the polymerization of isoprene to a polymeric material equivalent to natural balata in structure and properties. It relates particularly to improved catalyst materials for this polymerization, and to methods for the preparation and use of said catalyst materials.

The present invention relates more particularly to the polymerization of isoprene to substantially linear trans-polyisoprene of high crystallinity and high molecular weight or synthetic balata, with high catalyst efficiency, by use of novel catalyst materials made as described below by the interaction of an aluminum trialkyl and vanadium trichloride, supported on a finely divided supporting base material having a specific surface area of 3 to 50 square meters per gram. It is possible by the use of my improved supported catalyst materials to obtain catalyst efficiencies for the conversion of isoprene to synthetic balata up to 25 times those reported heretofore by others, that is, I attain an efficiency of over 400 grams of polymer per gram of $VCl_3$ used in preparing the catalyst, compared with an efficiency of 17 grams of polymer per gram of $VCl_3$ reported previously.

The broad field of heterogeneous catalysis of the polymerization of ethylenically unsaturated organic compounds, within which my invention lies, has been the subject of much published work during recent years. A striking characteristic of many of the disclosed catalysts is the specificity of a given catalyst, both with respect to the monomer or monomers with which it is active, and with respect to the structure of the polymer formed. So far as I know, the best catalyst heretofore reported for the polymerization of isoprene to give a polymer with a very high proportion of the monomer units connected in the trans-1,4 structure (i.e. a synthetic balata) is that disclosed in Belgian Patent No. 545,952. This patent uses a solid catalyst, insoluble in the polymerization medium, prepared by the reaction between a halogenated compound of a transition metal of the 4th, 5th, or 6th group of the periodic table and an organo-metallic compound, for example an aluminum or zinc alkyl; the catalysts are particularly suited for producing trans 1,4-polymers of 1,3-conjugated diolefins. The particular catalyst most suitable for making synthetic balata is that used in Example 11 of the Begian patent, made by the interaction of vanadium trichloride (1 mole proportion) with aluminum triethyl (3.2 mole proportions). Using normal heptane as a polymerization medium, and isoprene of high purity, this example shows a yield of about 17 grams of polymer per gram of vanadium trichloride. I have carried out many experiments by the method of this patent, in an effort to improve the catalyst efficiency, in which I varied the polymerization medium, the aluminum trialkyl used, and the molar ratio of aluminum to vanadium, and in which I carefully purified the isoprene and all the other ingredients. The best yield which I could obtain was about 120 grams of polymer per gram of vanadium trichloride, as shown in Example 3 below. In contrast, my new catalyst materials yield up to 500 grams of polymer per gram of vanadium trichloride.

The essential steps in making the supported catalyst materials of my invention are:

(1) Vanadium trichloride is formed in the presence of a finely divided inert supporting medium by decomposition of vanadium tetrachloride, according to the reaction:

$$2VCl_4 \rightarrow 2VCl_3 + Cl_2$$

(2) The supporting medium carrying the vanadium trichloride is washed, dried, and analyzed to determine its vanadium trichloride content.

(3) The supported vanadium trichloride is suspended in the liquid which is to be used as the polymerization medium, and the predetermined amount of aluminum trialkyl needed to give the desired ratio of vanadium to aluminum is added thereto. The catalyst material is then ready for use.

In a preferred method of preparing the supported $VCl_3$, the supporting material and the $VCl_4$ are placed in an inert liquid which serves as a solvent for the $VCl_4$ and as a suspension medium for the support. This liquid should be unreactive with $VCl_3$ and $VCl_4$, and, consequently, should be free of water and other compounds containing active hydrogen. Preferred liquids for this purpose are the saturated aliphatic hydrocarbons such as hexane, heptane, octane, cyclohexane, etc., and the aromatic hydrocarbons such as benzene, toluene, and xylene. The mixture containing the inert liquid, the $VCl_4$ and the supporting material is heated in a dry, inert atmosphere (e.g., nitrogen gas), while under agitation, to a temperature at which decomposition of the $VCl_4$ occurs, in accordance with the equation given above. Temperatures in the range 50° C. to 200° C. are suitable; the time required for substantially complete decomposition of the $VCl_4$ is from about 2 to about 4 hours at 80° C. The supported $VCl_3$ is subsequently filtered off, washed with an inert liquid, and heated in an inert atmosphere to volatilize any remaining liquid, and stored in an inert atmosphere.

In a second preferred method of preparing the supported catalyst, which gives equally good results, the above-described mixture of $VCl_4$, supporting material and inert liquid is agitated under reducing conditions for the $VCl_4$, such as exposure to ultraviolet radiation in the wave-length range 2000–4000 Angstrom units which is afforded, for example, by a quartz mercury vapor lamp. Substantially quantitative decomposition of the $VCl_4$ to give $VCl_3$ occurs. Upon completion of the reaction, the product is filtered off, washed, heated to volatilize extraneous solvent, and stored as described above.

Other methods of preparing the supported $VCl_3$ may be used. For example, visible light in the wave-length range 4000–8000 Angstrom units may be used in the last-described method instead of ultraviolet light; in this case, however, the decomposition will proceed more slowly at a given intensity level of the radiation. Another method consists in tumbling the support material in a closed container at temperatures in the range 100–160° C. while passing an inert gas carrying $VCl_4$ vapor through the container. I find, however, that I cannot prepare my catalyst material by reacting $VCl_4$ directly with the aluminum trialkyl in the presence of the support material. Although the vanadium is reduced to a valence of 3 or less by this procedure, the resulting materials are very inferior in catalytic activity to my catalytic materials. Apparently, to get the high catalyst efficiency of my invention, it is necessary to first form the $VCl_3$ in the presence of the support, and then react it with the aluminum trialkyl.

Numerous materials are suitable for use as the support, the only requirements being that they be insoluble and chemically inert in the presence of chlorine, chlorides of vanadium, and the solvents and monomers used in the preparation of the catalyst and in the polymerization; and that they have a specific surface area lying within certain limits. The specific surface area may be determined by the well-known Brunauer-Emmett-Teller (B.E.T.) gas absorption isotherm method (see Journ. Amer. Chem. Soc. 60, 309 (1938); "Catalysis," P. H. Emmett, Editor, vol. 1, chapters 1 and 2. Reinhold Publishing Company, 1954). As will be evident from the data given below, high catalyst efficiency in grams of polymer formed per gram of $VCl_3$ is obtained when the specific surface area of the support is within the limits 3–50 square meters per gram, and preferably 5–20 square meters per gram. Examples of materials suitable for the catalyst support are metallic and nonmetallic oxides, such as titanium dioxide, silica, alumina, magnesia, zirconia; natural and synthetic silicates, such as kaolin, talc, calcium silicate; and insoluble normal metal sulfates such as barium sulfate, strontium sulfate, calcium sulfate. Preferably, I use kaolin or titanium dioxide because of their substantially uniform specific surface areas and other desirable physical properties. However, any of the above-mentioned supports will suffice. Table I lists the trade name, supplier, and specific surface area of a few of the many suitable materials which are commercially available.

TABLE I

| Support | Trade Name | Supplier | Specific Surface, M.²/gm. |
|---|---|---|---|
| $TiO_2$(Anastase) | Titanox A | National Lead | 5.5–7.7 |
| $TiO_2$(Rutile) | | N.J. Zinc | 5.5 |
| $SiO_2$ | Celite | Johns Manville | .23 |
| $SiO_2$ | Dicalite #1 | Great Lakes Carbon | 20.3 |
| $SiO_2$ | Dicalite #105 | do | 29.3 |
| MgO | Magnesia Powder | do | 30 |
| $Al_2O_3.SiO_2$(Kaolin) | Continental Clay | R. T. Vanderbilt | 10 |
| $3MgO.4SiO_2.H_2O$ (talc) | Nytal 200 | do | 10 |

The high efficiency of my catalysts, expressed as grams of polymer formed per gram of $VCl_3$ used, is in all probability due to the formation of a relatively thin layer of catalyst on the surface of the carrier particles, whereby a larger proportion of the active material is exposed to the monomer than is the case with unsupported $VCl_3$, in which much of the potentially active material is in the interior of the particles. In accordance with this idea, I find that efficiency is lost if too large a proportion of $VCl_3$ is used with a given carrier. However, it also appears that the catalyst loses effectiveness if the $VCl_3$ is spread out too thinly on the carrier; this is evidenced by the relatively low efficiency of catalysts made on supports having large specific surface areas of 125 square meters per gram and up, when the weight of $VCl_3$ per unit surface area is relatively low.

To prepare the actual polymerization-active surface, the supported $VCl_3$ is suspended in at least a portion of the organic solvent or the monomeric isoprene which is to be used in the polymerization, precautions being taken to avoid the presence of water and other materials which react with $VCl_3$. Suitable solvents are those inert liquids characterized above as suitable for use in the step of coating the support with $VCl_3$; the isoprene monomer itself may also be used. The required amount of aluminum trialkyl is added, preferably as a solution in 1–20 parts by volume of the solvent, and the mixture is stirred for a few minutes. The temperature at which this reaction is carried out is not critical; room temperature is satisfactory. The catalyst material is ready for use at once, and is preferably used immediately.

The alkyl groups in the aluminum trialkyl may be any of the saturated straight-chain or branched alkyl groups represented by the formula $C_nH_{2n+1}$, where $n$ has any value greater than 1. Preferred alkyl groups are those in which $n$ is between 4 and 18 inclusive. The amount of aluminum trialkyl used, expressed as the molar ratio of the aluminum compound to the $VCl_3$, may range from 3/1 to 20/1; preferred ratios, which give the highest yields, are usually found to be between 4/1 and 7/1.

In the case of aluminum triisobutyl, which is a preferred trialkyl for use in my invention, the optimum molar ratio of aluminum trialkyl to $VCl_3$ is about 5/1.

The polymerization is carried out by adding to the catalyst suspension, prepared as described above, the isoprene and any additional solvent needed to give the desired dilution; the mixture is then agitated at the desired temperature until the polymerization reaction is completed. The amount of liquid (isoprene plus solvent) used is such as to give, at completion of the reaction, a solution of the product that is fluid enough to permit continued agitation of the mixture and recovery of the polymer as described below; usually 5 to 100 parts by weight of liquid per part by weight of polymer formed is satisfactory. For maximum efficiency in the utilization of the catalyst, the isoprene should be present in at least 50% excess over the amount of polymer formed.

The temperature at which the polymerization is carried out, while not critical, is preferably between about 40° and about 60° C. At temperatures below this range, the rate of reaction is sometimes undesirably lowered, and at temperatures above this range, undesired effects may occur which result in gel formation, lowered molecular weight of the polymer, and lowered yield, probably due to destruction of the catalyst.

The polymerization goes relatively rapidly at first, and slows down as polymer accumulates, eventually coming practically to a stop. Reaction times of 30–60 hours at temperatures around 50° C. give satisfactory yields of polymer.

The following examples serve to illustrate the practice of the invention, it being understood that the scope of the invention is not limited thereto or thereby.

*Example 1*

(a) PREPARATION OF SUPPORTED $VCl_3$

Seven grams of $TiO_2$ having a specific surface area of 5.5 square meters per gram plus 1.53 grams of $VCl_4$ in 50 cc. of dry benzene were stirred and irradiated with ultraviolet light from a quartz mercury arc for 3 hours under nitrogen. The reaction mixture was filtered and washed with benzene in a dry box, and vacuum-dried. Chlorine analysis of the catalyst material by the Volhard method indicated 7.48% Cl, corresponding to 11% $VCl_3$.

(b) POLYMERIZATION

Five-tenths gram of the supported $VCl_3$ prepared as described above (containing 55 mg. of $VCl_3$) was placed in a stainless steel bomb containing 350 gms. of dry benzene; 0.495 cc. (0.382 gm.) of triisobutylaluminum was added as a 10% solution in benzene. The bomb was then sealed. All of the above loading was done under argon. Sixty grams of isoprene were then injected into the bomb. The bomb was shaken on a shaking machine for 72 hours at 50° C. The bomb was then opened and the polymer was precipitated with about 800 cc. of methanol, washed with methanol, and dried.

Twenty-six grams of polymer were obtained. This corresponds to 474 gms. of polymer per gm. of $VCl_3$ used. The polymer obtained gave an infrared spectrum and an X-ray diffraction pattern substantially identical with those of natural balata. The synthetic material had a higher molecular weight than natural balata as shown by its intrinsic viscosity of 3.47 in benzene as compared with intrinsic viscosities of 1.0 to 2.0 for natural balata. That the synthetic material may be of a higher order of regularity than natural balata is evidenced by the higher degree of crystallinity of the synthetic material, as determined by X-ray measurements.

*Example 2*

(a) PREPARATION OF SUPPORTED $VCl_3$

Seven grams of kaolin with a specific surface area of 10 square meters per gram plus 3.06 gm. $VCl_4$ in 50 cc. of dry benzene were irradiated with ultraviolet light for 3 hours under nitrogen, whereby the VCl$_4$ was converted to VCl$_3$. The reaction mixture was handled as in Example 1(a). Analysis: Cl found, 10.55% (15.5% VCl$_3$).

(b) POLYMERIZATION

The procedure for polymerization was identical with that of Example 1 except for the amounts of VCl$_3$ and aluminum alkyl. Five-tenths gram of the above catalyst constituent (equivalent to 77.5 mg. of VCl$_3$) plus .635 cc. (0.490 gm.) of aluminum triisobutyl as a 10% solution in benzene were used; 29.6 gms. of polymer equivalent to natural balata were obtained. This corresponds to 382 grams of polymer per gram of VCl$_3$. The polymer was a synthetic balata of high crystallinity, with an intrinsic viscosity of 8.62 in benzene.

Example 3

This example illustrates a run with unsupported VCl$_3$, to show the best results attainable by the method of the prior art.

VCl$_3$ was prepared by thermal decomposition of VCl$_4$, the crude product being extracted with benzene to remove undecomposed VCl$_4$. 0.5 gram of the finely divided VCl$_3$, 2.7 cc. (2.08 gm.) of aluminum triisobutyl, and 400 cc. of dry benzene were agitated in a 750 cc. stainless steel bomb for a few minutes. 80 grams of isoprene were then added, and the bomb was shaken at 50° C. for 72 hours. The product was 59.5 gm. of synthetic balata, corresponding to 119 gm. of polymer per gram of VCl$_3$.

When this experiment was carried out with a commercial sample of VCl$_3$, 80–90 gm. of polymer per gram of VCl$_3$ were obtained. Ball milling the commercial VCl$_3$ to increase its surface area did not increase the efficiency of the catalyst.

Example 4

This example illustrates the preparation of the supported VCl$_3$ by thermal decomposition of VCl$_4$. About 200 cc. of benzene+9 gm. of VCl$_4$+20 gm. of kaolin having a specific surface area of 10 square meters per gram were placed in a 500 cc. flask fitted with a stirrer, reflux condenser, and an argon inlet tube. The mixture was refluxed for 4 hours in an atmosphere of argon. At the end of this time the mixture was cooled and filtered in a nitrogen-filled dry box. The solid isolated was washed with dry benzene and dried under vacuum. Analysis: Cl found, 16.64% (24.6% VCl$_3$).

The procedure for polymerization was identical with that of Example 1(b) except for the amount of VCl$_3$ and aluminum alkyl. 0.29 gm. of the above catalyst material (equivalent to 70 mg. of VCl$_3$) plus .575 cc. (0.444 gm.) of aluminum triisobutyl as a 10% solution in benzene were used. 24.3 gm. of polymer equivalent to natural balata were obtained. This corresponds to 348 gm. of polymer per gram of VCl$_3$.

Example 5

0.29 gm. of the kaolin-supported VCl$_3$ material of Example 4, containing 70 mg. of VCl$_3$, was placed in a stainless steel bomb containing 350 gm. of dry benzene, 1.45 gm. of aluminum tridodecyl as a 10% solution in benzene were added, followed by 60 gm. of isoprene. Following the procedure described in Example 1, polymerization for 72 hours at 50° C. yielded 30.7 gm. of polymer, corresponding to 440 gm. of polymer per gram of VCl$_3$. The polymer was a highly crystalline balata-like product, similar to that obtained in the other examples.

Example 6

0.45 gm. of kaolin-supported VCl$_3$ material containing 15.5% or 70 mg. of VCl$_3$, prepared as in Example 4, was placed in a stainless steel bomb containing 120 gm. of benzene. 0.26 gm. of aluminum triethyl as a 25% solution in n-heptane was added, followed by 120 gm. of isoprene. Polymerization for 72 hours at 50° C. yielded 11.5 gm. (i.e., 165 grams per gram of VCl$_3$) of a balata-like product.

An experiment using an unsupported catalyst prepared from VCl$_3$ and aluminum triethyl, following substantially the procedure of Example 3 above, but using aluminum triethyl instead of aluminum tri-isobutyl, yielded about 15 gm. of polymer per gram of VCl$_3$. (This agrees closely with the yield of 17 gm. of polymer per gram of VCl$_3$ shown in Example 11 of Belgian Patent No. 545,-952, using an unsupported VCl$_3$-aluminum triethyl catalyst.)

Thus it appears that although aluminum triethyl may be inferior to the higher aluminum trialkyls for use in preparing catalysts for isoprene polymerization, the supported catalyst materials of my invention also have a decided and unexpected advantage over the unsupported catalysts of the prior art, even in this case.

Examples 7–9

In these examples, the supported VCl$_3$ was prepared as in Example 4. The amounts of VCl$_3$ (70 mg.) and aluminum triisobutyl (0.444 gm.) used in making the catalyst were the same as in Example 4. The polymerization procedure was the same as that of Example 1, except that the amounts of solvent and of isoprene were those shown in the following table, which also gives the yield and catalyst efficiency.

| Example | Solvent and Amount | Grams Isoprene | Yield, grams | Gm. polymer gm. VCl$_3$ |
|---|---|---|---|---|
| 7 | Benzene, 120 gms | 120 | 27.6 | 395 |
| 8 | None | 240 | 30.4 | 435 |
| 9 | n-Heptane, 120 gms | 120 | 27.8 | 398 |

Examples 10–30

These examples were carried out as follows: 350 grams of benzene were placed in a well-dried stainless steel bomb of 750 cc. capacity, working in an atmosphere of dry argon. An amount of a supported VCl$_3$ catalyst material (prepared as in the previous examples) containing 50–100 mg. of VCl$_3$ was weighed into a dry 25 cc. Erlenmeyer flask in a dry atmosphere, and was added to the bomb. Five stainless steel balls were added to prevent clumping of the powdered catalyst. The desired amount of aluminum triisobutyl as a 10% solution in benzene was added from a hypodermic syringe. The bomb was sealed and shaken for about 5 minutes. 60 grams of isoprene were then injected into the bomb, and it was shaken for 65 hours at 50° C.

At the end of the heating period, the contents of the bomb were placed in about 800 cc. of methanol, and shredded with a high-speed mixer (Waring Blendor). The polymer was filtered from the mixture, washed with methanol and dried at 40° C. under vacuum.

The results are shown in Table II, which also includes the results of Examples 1–3 for comparison. It is clear that, in comparison with the best yield obtained with an unsupported catalyst (i.e. 119 grams of polymer per gram of VCl$_3$ in Example 3), greatly improved yields are obtained with the supported catalyst materials of my invention, using supports of various chemical compositions and of various particle sizes, and using various aluminum alkyls in various molar ratios to the vanadium trichloride:

The chemical nature of the support is immaterial, provided that it is inert. The specific surface area of the support per se does not appear to be critical; but I have found that for good results the specific area should be below 50 square meters per gram, and preferably below 30 square meters per gram. This may be due to the fact that the thickness of the layer of active catalyst on the carrier surface is of importance, and should be of the order of 5 to 100 milligrams per square meter, preferably from about 12 to about 60 milligrams per square meter, calculated as $VCl_3$ present before reaction with the aluminum alkyl (see column 5 of Table II). A support with a specific surface area of 50 or more square meters per gram, covered with 20 mg. of $VCl_3$ per square meter, would require at least an equal weight of $VCl_3$; the resulting product would resemble a mass of $VCl_3$ with particles of "support" embedded in it, and would have a low activity. At the other extreme, a support with a low specific surface area, such as the Carborundum of Example 31, has too small a surface area to provide useful amounts of catalyst without using excessively large amounts of support. Whatever the explanation may be, I find it preferable to use supporting materials having specific surface areas between 3 and 30 square meters per gram.

TABLE II

| Example No. | Support Material | Spec. Area, M²/gm. | Percent VCl₃ | Mg. VCl₃ Per Sq. Meter | Ratio AL/V | Gm. Polym. Per gm. VCl₃ |
|---|---|---|---|---|---|---|
| 3 | None | | 100 | | 3.2/1 | 119 |
| 10 | Clay | 10 | 13.5 | 16 | 5/1 | 394 |
| 2 | Clay | 10 | 15.5 | 18 | 5/1 | 382 |
| 11 | Clay | 10 | 20.8 | 26 | 5/1 | 425 |
| 12 | Clay | 10 | 21.7 | 27 | 5/1 | 431 |
| 13 | Clay | 10 | 30.5 | 44 | 5/1 | 465 |
| 14 | Clay | 10 | 15.5 | 18 | 10/1 | 300 |
| 15 | TiO₂ | 5.5 | 1.1 | 2 | 5/1 | None |
| 16 | TiO₂ | 5.5 | 2.3 | 4 | 5/1 | 176 |
| 17 | TiO₂ | 5.5 | 7.5 | 15 | 5/1 | 216 |
| 1 | TiO₂ | 5.5 | 11 | 22 | 5.5/1 | 474 |
| 18 | TiO₂ | 5.5 | 18.3 | 40 | 5.5/1 | 418 |
| 19 | TiO₂ | 5.5 | 20.4 | 47 | 5/1 | 415 |
| 20 | TiO₂ | 5.5 | 24 | 57 | 5/1 | 300 |
| 21 | TiO₂ | 5.5 | 18.3 | 40 | 3/1 | 165 |
| 18 | TiO₂ | 5.5 | 18.3 | 40 | 5.5/1 | 418 |
| 22 | TiO₂ | 5.5 | 18.3 | 40 | 11/1 | 319 |
| 23 | TiO₂ | 5.5 | 18.3 | 40 | 16.5/1 | 264 |
| 24 | TiO₂ | 5.5 | 18.3 | 40 | 22/1 | 257 |
| 25 | TiO₂ | 5.5 | 13.8 | 29 | 4/1 | 420 |
| 26 | SiO₂ | 23 | 17.5 | 9 | 5/1 | 212 |
| 27 | SiO₂ | 20.3 | 19.8 | 12 | 5/1 | 200 |
| 28 | SiO₂ | 29.3 | 10 | 4 | 10/1 | 147 |
| 29 | MgO | 30 | 34 | 17 | 5/1 | 256 |
| 30 | Talc | 10 | 17.4 | 21 | 5/1 | 264 |
| 31 | SiC | 1 | 23 | 300 | 5/1 | 74 |

The use of my supported catalysts, in addition to being more efficient in economy of the expensive catalyst materials, has several other advantages over the use of unsupported catalysts based on $VCl_3$. The polymerization rate is several times faster with the supported catalysts. Also the reduction of vanadium residues in the finished polymer to a safe level is facilitated by the relatively low level of vanadium present to start with.

Having thus described my invention, what I claim and desire to protect by Letters Patent is:

1. A method for the preparation of a catalyst for the polymerization of isoprene to transpolyisoprene which comprises decomposing vanadium tetrachloride in the presence of a finely divided inert solid supporting base, thereby coating the surface of said base with a thin layer of vanadium trichloride, suspending the supported vanadium trichloride in an organic solvent selected from the group consisting of aromatic liquid hydrocarbons, saturated aliphatic liquid hydrocarbons, and isoprene, and adding thereto an aluminum trialkyl to form the actual polymerization-active catalytic surface, the molar ratio of aluminum trialkyl to vanadium trichloride being from 3:1 to 20:1.

2. A catalyst made by the method of claim 1.

3. A method as in claim 1, wherein the aluminum trialkyl is aluminum triisobutyl and the mole ratio of said aluminum compound to vanadium trichloride is in the range of from 4:1 to 7:1.

4. A method as in claim 3, wherein the supporting base is kaolin having a specific surface area of from 5 to 20 square meters per gram.

5. A method as in claim 3, wherein the supporting base is titanium dioxide having a specific surface area of from 5 to 20 square meters per gram.

6. A method for the preparation of a catalyst for the polymerization of isoprene to transpolyisoprene which comprises decomposing vanadium tetrachloride in the presence of a finely divided inert solid supporting base, said base having a specific surface area of from 3 to 50 square meters per gram and being substantially chemically inert in the presence of chlorine, chlorides of vanadium, aromatic and saturated aliphatic liquid hydrocarbons, monomeric isoprene, and trans-polyisoprene, thereby coating the surface of said base with a thin layer of vanadium trichloride, suspending the supported vanadium trichloride in an organic solvent selected from the group consisting of aromatic liquid hydrocarbons, saturated aliphatic liquid hydrocarbons, and isoprene, and adding thereto from 3 to 20 moles of an aluminum trialkyl per mole of vanadium trichloride to form the actual polymerization-active catalytic surface.

7. A catalyst made by the method of claim 6.

8. A method for the preparation of a catalyst for the polymerization of isoprene to transpolyisoprene which comprises exposing a finely divided inert supporting base at a temperature of 100° C. to 160° C. to the vapors of vanadium tetrachloride to decompose the vanadium tetrachloride to vanadium trichloride, thereby coating the surface of said base with a thin layer of vanadium trichloride, suspending the supported vanadium trichloride in an organic solvent selected from the group consisting of aromatic liquid hydrocarbons, saturated aliphatic liquid hydrocarbons, and isoprene, and adding thereto an aluminum trialkyl to form the actual polymerization-active catalytic surface.

9. A method for the preparation of a catalyst for the polymerization of isoprene to transpolyisoprene which comprises suspending a finely divided inert solid supporting base in an organic solvent solution of vanadium tetrachloride, said solvent being selected from the group consisting of aromatic liquid hydrocarbons, saturated aliphatic liquid hydrocarbons, and isoprene, decomposing vanadium tetrachloride to form vanadium trichloride, thereby coating the surface of said base with a thin layer of vanadium trichloride, and adding thereto from 3 to 20 moles of an aluminum trialkyl per mole of vanadium trichloride to form the actual polymerization-active catalytic surface.

10. A method as in claim 9, wherein the aluminum trialkyl is aluminum triisobutyl and the mole ratio of said aluminum compound to vanadium trichloride is in the range of from 4:1 to 7:1.

11. A catalyst made by the method of claim 10.

12. A method for the preparation of a catalyst for the polymerization of isoprene to transpolyisoprene which comprises suspending a finely divided inert solid supporting base in an organic solvent solution of vanadium tetrachloride, said solvent being selected from the group consisting of aromatic liquid hydrocarbons, saturated aliphatic liquid hydrocarbons, and isoprene, decomposing vanadium tetrachloride to form vanadium trichloride by heating the suspension to a temperature of from 50° C. to 200° C., thereby coating the surface of said base with a thin layer of vanadium trichloride, and adding thereto from 3 to 20 moles of an aluminum trialkyl per mole of vanadium trichloride to form the actual polymerization-active catalytic surface.

13. A method for the preparation of a catalyst for the polymerization of isoprene to transpolyisoprene which comprises suspending a finely divided inert solid supporting base in an organic solvent solution of vanadium tetrachloride, said solvent being selected from the group consisting of aromatic liquid hydrocarbons, saturated aliphatic liquid hydrocarbons, and isoprene, decomposing vanadium tetrachloride to form vanadium trichloride by irradiating the suspension with electromagnetic radiation in the wave-length range 2000–8000 Angstrom units, thereby coating the surface of said base with a thin layer of vanadium trichloride, and adding thereto 3 to 20 moles of an aluminum trialkyl per mole of vanadium trichloride to form the actual polymerization-active catalytic surface.

14. A method for the preparation of a catalyst for the polymerization of isoprene to transpolyisoprene which comprises suspending a finely divided inert solid supporting base in an organic solvent solution of vanadium tetrachloride, said solvent being selected from the group consisting of aromatic liquid hydrocarbons, saturated aliphatic liquid hydrocarbons, and isoprene, decomposing said vanadium tetrachloride to form vanadium trichloride by heating the suspension to a temperature of from 50° C. to 200° C., thereby coating the surface of said base with a thin layer of vanadium trichloride, removing the organic solvent, and recovering solvent-free supported vanadium trichloride.

15. A method for the preparation of a catalyst for the polymerization of isoprene to transpolyisoprene which comprises suspending a finely divided inert solid supporting base in an organic solvent solution of vanadium tetrachloride, said solvent being selected from the group consisting of aromatic liquid hydrocarbons, saturated aliphatic liquid hydrocarbons, and isoprene, decomposing said vanadium tetrachloride to form vanadium trichloride by irradiating the suspension with electromagnetic radiation in the wave-length range 2000–8000 Angstrom units, thereby coating the surface of said base with a thin layer of vanadium trichloride, removing the organic solvent, and recovering solvent-free supported vanadium trichloride.

References Cited in the file of this patent
UNITED STATES PATENTS

| | | |
|---|---|---|
| 2,609,366 | Fryling | Sept. 2, 1952 |
| 2,614,100 | Uraneck | Oct. 14, 1952 |
| 2,846,427 | Findlay | Aug. 5, 1958 |
| 2,881,156 | Pilar et al. | Apr. 7, 1959 |
| 2,905,659 | Miller et al. | Sept. 22, 1959 |
| 2,910,461 | Nowlin et al. | Oct. 27, 1959 |
| 2,925,392 | Seelbach | Feb. 16, 1960 |
| 2,943,063 | Eby | June 28, 1960 |

FOREIGN PATENTS

| | | |
|---|---|---|
| 218,210 | Australia | Nov. 3, 1958 |

OTHER REFERENCES

Natta et al.: Gazzetta Chimica Italiana, vol. 87, No. 5, May 1957, pages 570–585.

Gaylord et al.: Linear and Stereoregular Addition Polymers, Interscience Pub. Inc., N.Y., 1959, pp. 158 and 222.